United States Patent
Ogawa et al.

(10) Patent No.: US 12,430,519 B2
(45) Date of Patent: Sep. 30, 2025

(54) DATA PROCESSING DEVICE, DATA PROCESSING METHOD, AND DATA PROCESSING PROGRAM

(71) Applicant: NIPPON TELEGRAPH AND TELEPHONE CORPORATION, Tokyo (JP)

(72) Inventors: Atsunori Ogawa, Musashino (JP); Naohiro Tawara, Musashino (JP); Marc Delcroix, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 228 days.

(21) Appl. No.: 18/030,275

(22) PCT Filed: Oct. 7, 2020

(86) PCT No.: PCT/JP2020/038006
§ 371 (c)(1),
(2) Date: Apr. 5, 2023

(87) PCT Pub. No.: WO2022/074760
PCT Pub. Date: Apr. 14, 2022

(65) Prior Publication Data
US 2024/0005104 A1    Jan. 4, 2024

(51) Int. Cl.
*G06F 40/253* (2020.01)
*G06F 40/56* (2020.01)

(52) U.S. Cl.
CPC ............ *G06F 40/56* (2020.01); *G06F 40/253* (2020.01)

(58) Field of Classification Search
CPC ...... G06F 40/56; G06F 40/253; G06F 40/237; G06F 40/284; G06F 40/268
See application file for complete search history.

(56) References Cited

U.S. PATENT DOCUMENTS

| | | | | |
|---|---|---|---|---|
| 8,326,598 B1 * | 12/2012 | Macherey | ............... | G06F 40/58 704/4 |
| 2013/0018649 A1 * | 1/2013 | Deshmukh | .............. | G06F 40/56 704/9 |

(Continued)

FOREIGN PATENT DOCUMENTS

| | | |
|---|---|---|
| CN | 102650988 A | 8/2012 |
| JP | 2019-159743 A | 9/2019 |
| JP | 2020-112915 A | 7/2020 |

OTHER PUBLICATIONS

Rosti et al., Improved Word-Level System Combination for Machine Translation, 2007, Proceedings of the 45th Annual Meeting of the Association of Computational Linguistics, pp. 312-219 (Year: 2007).*

(Continued)

*Primary Examiner* — Pierre Louis Desir
*Assistant Examiner* — Cody Douglas Hutcheson
(74) *Attorney, Agent, or Firm* — XSENSUS LLP

(57) ABSTRACT

A data processing device includes processing circuitry configured to extract a second word corresponding to a first word included in first text from among a plurality of words belonging to a predetermined domain, repeat processing in the extraction for all words included in the first text to generate a confusion network that expresses a plurality of sentence possibilities with one network configuration and is an expression format of a word sequence, and search for a grammatically correct word string in the confusion network using a language model that evaluates grammatical correctness of the word string, and select a word string to be output.

15 Claims, 8 Drawing Sheets

(56) References Cited

U.S. PATENT DOCUMENTS

2013/0054224 A1* 2/2013 Jiang .................. G06F 40/44 704/2
2019/0286709 A1 9/2019 Okura et al.

OTHER PUBLICATIONS

Prasov et al., Fusing Eye Gaze with Speech Recognition Hypotheses to Resolve Exophoric References in Situated Dialogue, 2010, Proceedings of the 2010 Conference on Empirical Methods in Natural Language Processing, pp. 471-481 (Year: 2010).*

Stolcke, "SRILM—An Extensible Language Modeling Toolkit", International Conference on Spoken Language Processing, ICSLP, Proceedings, 2002, 4 pages.

HSU, "Generalized Linear Interpolation of Language Models", ASRU, 2007, pp. 136-140.

Mangu et al., "Finding Consensus in Speech Recognition: Word Error Minimization and Other Applications of Confusion Networks", Computer Speech and Language, vol. 14, No. 4, arXiv:cs/0010012v1 [cs.CL], Oct. 7, 2000, 35 pages.

Kobayashi, "Contextual Augmentation: Data Augmentation by Words with Paradigmatic Relations", Proc. NAACL-HLT, 2018, 6 pages.

Maekawa, "Corpus of Spontaneous Japanese: Its Design and Evaluation", Proc. Workshop on Spontaneous Speech Processing and Recognition (SSPR), 2003, 6 pages.

Hori et al., "Low-Latency Real-Time Meeting Recognition and Understanding Using Distant Microphones and Omni-Directional Camera", IEEE Transactions on Audio, Speech, and Language Processing, vol. 20, No. 2, Feb. 2012, pp. 499-513.

Vaswani et al., "Attention Is All You Need", 31st Conference on Neural Information Processing Systems (NIPS), 2017, 15 pages.

Ogawa et al., "Unsupervised Domain Transfer for Training Data Augmentation of Language Modeling", Reports of the 2020 Autumm Meeting of the Acoustical Society of Japan 1-2-9, 2020, 5 pages including English Translation.

* cited by examiner

Fig. 6

|  | LEARNING DATA | | DEVELOPMENT DATA | EVALUATION DATA |
|---|---|---|---|---|
| CORPUS | CSJ | NTT | NTT | NTT |
| DOMAIN (STYLE) | LECTURE | CONVERSATION | CONVERSATION | CONVERSATION |
| TIME | 537 | 106 | 11 | 11 |
| NUMBER OF SENTENCES | 413k | 59k | 4748 | 4646 |
| NUMBER OF WORDS | 7M | 396k | 32k | 32k |
| AVERAGE LENGTH (NUMBER OF WORDS) OF ONE SENTENCE | 17.3 | 6.7 | 6.8 | 6.9 |
| VOCABULARY SIZE | 66.6k | 11.1k | 2381 | 2325 |

Fig. 7

| No. | Model | NTT DEVELOPMENT DATA | | | NTT EVALUATION DATA | | |
|---|---|---|---|---|---|---|---|
| | | OOV | PPL | WER | OOV | PPL | WER |
| 1 | NTT | 1.42 | (44.9) | 21.8 | 1.34 | (44.5) | 21.3 |
| 2 | CSJ | 2.07 | (136.9) | 23.0 | 2.04 | (134.9) | 22.2 |
| 3 | GenCSJx1 | 0.79 | (85.7) | 21.6 | 0.71 | (89.2) | 20.7 |
| 4 | GenCSJx10 | 0.51 | (79.7) | 20.7 | 0.47 | (82.1) | 19.9 |
| 5 | GenCSJx100 | 0.49 | (76.2) | 20.4 | 0.45 | (78.3) | 19.6 |
| 6 | NTT+CSJ | 0.39 | 46.4 | 20.2 | 0.40 | 45.3 | 19.4 |
| 7 | NTT+CSJ+GenCSJx1 | 0.39 | 46.4 | 20.0 | 0.40 | 45.4 | 19.1 |
| 8 | NTT+CSJ+GenCSJx10 | 0.39 | 45.1 | 19.8 | 0.40 | 44.1 | 18.9 |
| 9 | NTT+CSJ+GenCSJx100 | 0.39 | 44.3 | 19.6 | 0.40 | 43.3 | 18.7 |

DATA PROCESSING DEVICE, DATA PROCESSING METHOD, AND DATA PROCESSING PROGRAM

CROSS-REFERENCE TO RELATED APPLICATION

The present application is based on PCT filing PCT/JP2020/038006, filed Oct. 7, 2020, the entire contents of which are incorporated herein by reference.

TECHNICAL FIELD

The present invention relates to a data processing device, a data processing method, and a data processing program.

BACKGROUND ART

Conventionally, voice recognition by a neural network is known. Furthermore, in the voice recognition, an acoustic model and a language model are used. Since voice recognition is technology that inherently has high domain dependency, it may be difficult to secure text serving as learning data of a language model particularly in a domain having few available resources such as natural utterances and minor languages.

On the other hand, as a method for obtaining learning data of a language model, for example, a method of collecting text data related to a target domain by web search and a method of using a large amount of text data of another domain having sufficient resources in addition to a small amount of text data of the target domain (for example, refer to Non Patent Literatures 1 and 2) are known.

CITATION LIST

Non Patent Literature

Non Patent Literature 1: A. Stolcke, "SRILM-AN EXTENSIBLE LANGUAGE MODELING TOOLKIT", in Proc. ICSLP, 2002, pp. 901-904.

Non Patent Literature 2: B.-J. Hsu, "GENERALIZED LINEAR INTERPOLATION OF LANGUAGE MODELS", in Proc. ASRU, 2007, pp. 549-552.

Non Patent Literature 3: L. Mangu, E. Brill, and A. Stolcke, "Finding consensus in speech recognition: word error minimization and other applications of confusion networks", Computer Speech and Language 14 (4), 373-400, October 2000.

SUMMARY OF INVENTION

Technical Problem

However, the conventional method has a problem that it may be difficult to enrich learning data for improving the accuracy of the language model. For example, the method of collecting text data related to a target domain by web search has a problem that the collected data needs to be carefully shaped. In addition, the method using a large amount of text data of another domain having sufficient resources has a problem that the effect depends on how close the target domain and the other domain are.

The present invention has been made in view of the above, and an object of thereof is to provide a data processing device, a data processing method, and a data processing program capable of enriching learning data to improve the accuracy of a language model.

Solution to Problem

In order to solve the above-described problems and achieve the object, according to the present invention, there is provided a data processing device including: processing circuitry configured to: extract a second word corresponding to a first word included in first text from among a plurality of words belonging to a predetermined domain; repeat processing in the extraction for all words included in the first text to generate a confusion network that expresses a plurality of sentence possibilities with one network configuration and is an expression format of a word sequence; and search for a grammatically correct word string in the confusion network using a language model that evaluates grammatical correctness of the word string, and select a word string to be output.

Advantageous Effects of Invention

According to the present invention, it is possible to enrich learning data to improve the accuracy of a language model.

BRIEF DESCRIPTION OF DRAWINGS

FIG. 6 is a diagram illustrating details of a data set.

FIG. 7 is a diagram illustrating an experimental result in a verification experiment.

DESCRIPTION OF EMBODIMENTS

Figure 1:
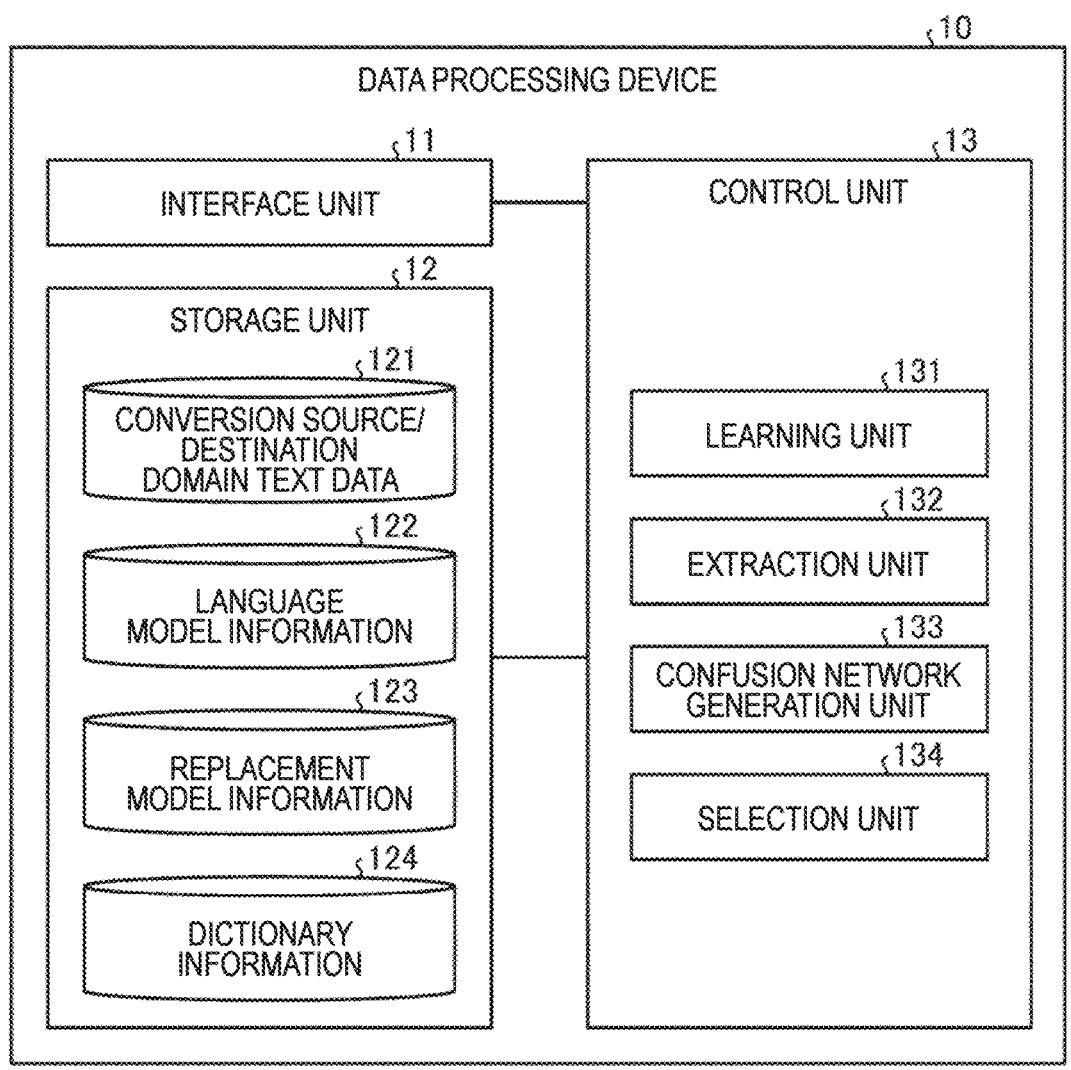
FIG. 1 is a diagram schematically illustrating an example of a configuration of a data processing device according to an embodiment.

Hereinafter, an embodiment of the present invention will be described in detail with reference to the drawings. Note that the present invention is not limited by this embodiment. Further, in the description of the drawings, the same portions are denoted by the same reference signs. In the following description, when "— A" is shown for A, it is assumed to be equivalent to "the symbol '^' immediately above 'A'."

In each of the following embodiments, a word string in which words are arranged is referred to as a "sentence" or "text." In addition, the number of words included in the sentence is defined as "sentence length." In addition, a position at which a word appears in a sentence is defined as "time."

For example, the sentence "watashi wa ryori ga suki (I like cooking)" has a length of 5 because the sentence consists of 5 words. In addition, the word at time 1 of the sentence is "watashi." In addition, the word at time 2 of the sentence is "wa." In addition, the word at the time 3 of the sentence is "ryori." In addition, the words in the sentence are specified by morphological analysis or the like.

Here, in the embodiment, sentences and words are classified into domains. For example, the domain classification method may be based on the content of a sentence such as a subject or a field, or may be based on a style such as a common style ("da/dearu style"), a formal style ("desu/masu style"), a lecture style, a colloquial style, or a conversational style. In addition, the domain classification method may combine the above criteria.

Furthermore, the domain may be paraphrased as "style," "category," and the like. In addition, the domains may be manually classified, or may be automatically classified using a model for classification.

An object of a data processing device according to an embodiment is to enrich learning data of a predetermined domain. The data processing device uses text of the first domain as an input, and generates text of the second domain. For example, in a case where the text of the second domain cannot be sufficiently prepared, or the like, the data processing device generates the text of the second domain by using the text of the first domain available in large quantities. Furthermore, by adding the generated text to the learning data, the data processing device can enrich the learning data and contribute to improvement in accuracy of the language model of the second domain.

The data processing device of the embodiment converts a domain of unsupervised text. In the present embodiment, "unsupervised" means that the text of the conversion destination domain paired with the text of the conversion source domain is not used. As a result, according to the data processing device, it is possible to enrich text data of a domain that is difficult to obtain based on text of a domain in which a large amount of text exists.

Note that the language model is, for example, an N-gram, a neural network, or the like. The N-gram is obtained by modeling an appearance probability of each word at a certain time based on a result of performing morphological analysis on a large amount of electronized sentences on the assumption that an appearance probability of a word at a certain time in a sentence is determined depending on N−1 words in the past. Note that a model depending on one past word (N=2) is called a bigram. In addition, a model depending on the past two words (N=3) is called a trigram. The N-gram is a generalization of these.

[Embodiment] [Configuration of Data Processing Device]

First, a configuration of a data processing device according to an embodiment will be described with reference to FIG. 1. FIG. 1 is a diagram illustrating a configuration example of the data processing device according to the embodiment. As illustrated in FIG. 1, a data processing device 10 includes an interface unit 11, a storage unit 12, and a control unit 13.

The interface unit 11 is an interface for inputting and outputting data. The interface unit 11 receives an input of data via an input device such as a mouse or a keyboard. Furthermore, the interface unit 11 outputs data to an output device such as a display.

The storage unit 12 is a storage device such as a hard disk drive (HDD), a solid state drive (SSD), or an optical disc. Note that the storage unit 12 may be a semiconductor memory capable of rewriting data, such as a random access memory (RAM), a flash memory, or a non-volatile static random access memory (NVSRAM). The storage unit 12 stores an operating system (OS) and various programs executed by the data processing device 10. The storage unit 12 stores conversion source/destination domain text data 121, language model information 122, replacement model information 123, and dictionary information 124.

The conversion source/destination domain text data 121 is a set of text classified into the conversion source domain and a set of text classified into the conversion destination domain. The conversion destination domain may be a domain in which it is difficult to collect text.

The language model information 122 is a parameter or the like for constructing a language model such as an N-gram. The replacement model information 123 is a parameter or the like for constructing a replacement model to be described later. When the replacement model is a bidirectional long short-term memory (LSTM), the replacement model information 123 is a weight of each layer or the like.

The dictionary information 124 is data in which words are indexed. The dictionary information 124 includes words of both the domains of the conversion source and the conversion destination.

The control unit 13 controls the entire data processing device 10. Note that the control unit 13 includes, for example, an electronic circuit such as a central processing unit (CPU) or a micro processing unit (MPU), or an integrated circuit such as an application specific integrated circuit (ASIC) or a field programmable gate array (FPGA). Further, the control unit 13 includes an internal memory for storing programs and control data defining various processing procedures, and executes each processing using the internal memory. Furthermore, the control unit 13 functions as various processing units by various programs operating.

Figure 2:
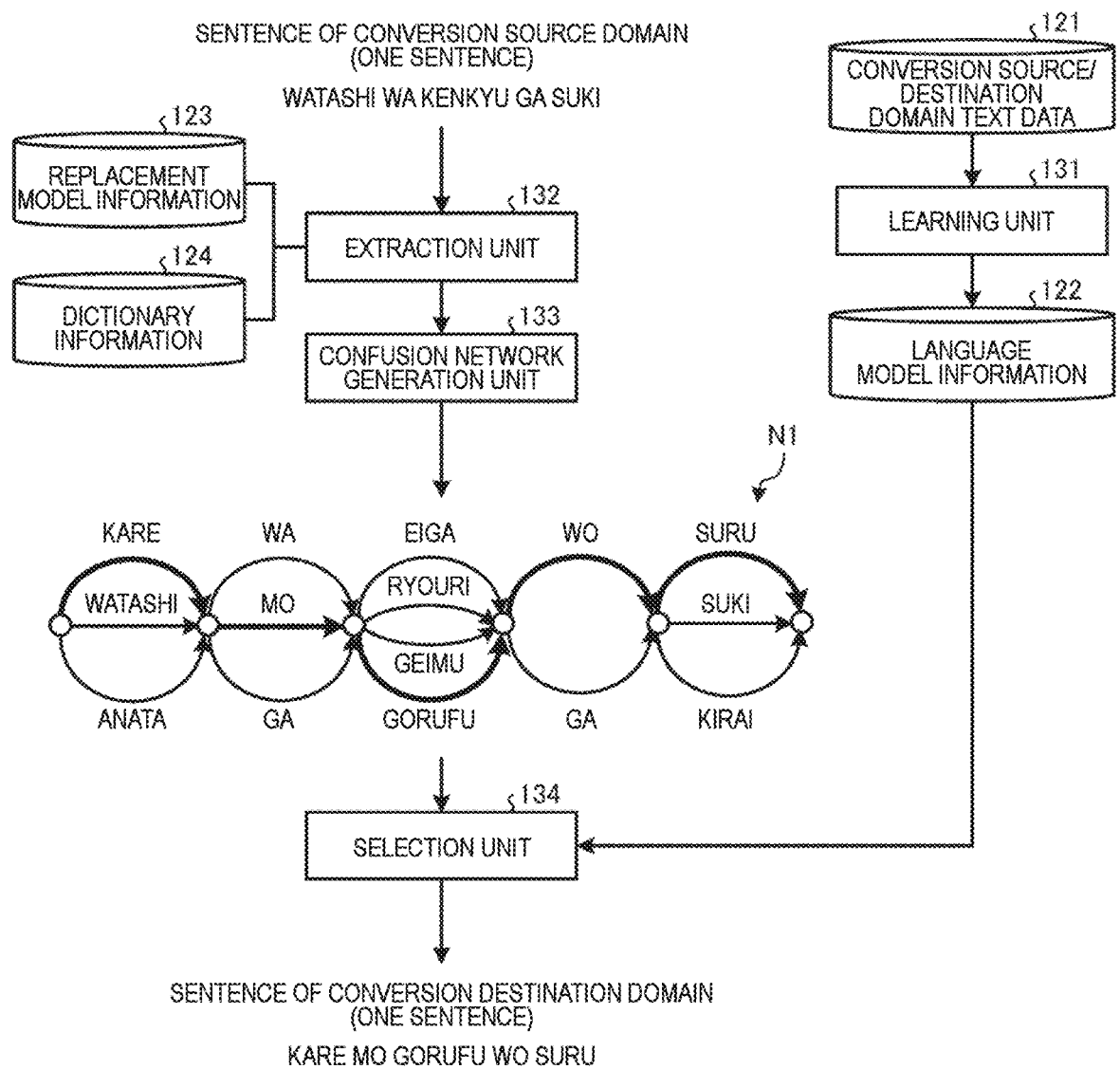
FIG. 2 is a diagram for explaining a flow of processing of the data processing device illustrated in FIG. 1.

For example, the control unit 13 includes a learning unit 131, an extraction unit 132, a confusion network generation unit 133 (generation unit), and a selection unit 134. Here, details of each unit included in the control unit 13 will be described with reference to FIG. 2. FIG. 2 is a diagram for explaining a flow of processing of the data processing device 10 illustrated in FIG. 1.

The learning unit 131 learns the language model using the conversion source/destination domain text data 121. In the learning of the language model, in order to learn a language model more suitable for the conversion destination domain, for example, the language model learned using the conversion source/destination domain text data may be model-adapted to the conversion destination domain by further using only the conversion destination domain text data. Alternatively, for example, two language models may be learned by individually using the conversion source domain text data and the conversion destination domain text data, and parameters of the two language models may be weighted and added to create one language model. At this time, in order to create a more suitable language model in the conversion destination domain, the weight of the language model learned with the conversion destination domain text data is set to be large. The learning unit 131 stores information such as parameters of the learned language model in the storage unit 12 as the language model information 122.

The extraction unit 132 extracts a second word corresponding to the first word included in the first text (sentence) from among a plurality of words belonging to a predetermined domain. The confusion network generation unit 133 repeatedly performs this extraction processing on all the words included in the first text (sentence) to generate a confusion network capable of compactly expressing a plurality of word strings (refer to Non Patent Literature 3 for details of the confusion network).

Specifically, as illustrated in FIG. 2, the extraction unit 132 inputs a sentence of the conversion source domain to a replacement model constructed based on the replacement model information 123. Then, word possibilities are extracted from the plurality of words included in the dictionary information 124 based on the output result of the replacement model. Note that the sentence "watashi wa kenkyu ga suki (I like research)" as the conversion source is an example of the first text.

Figure 3:
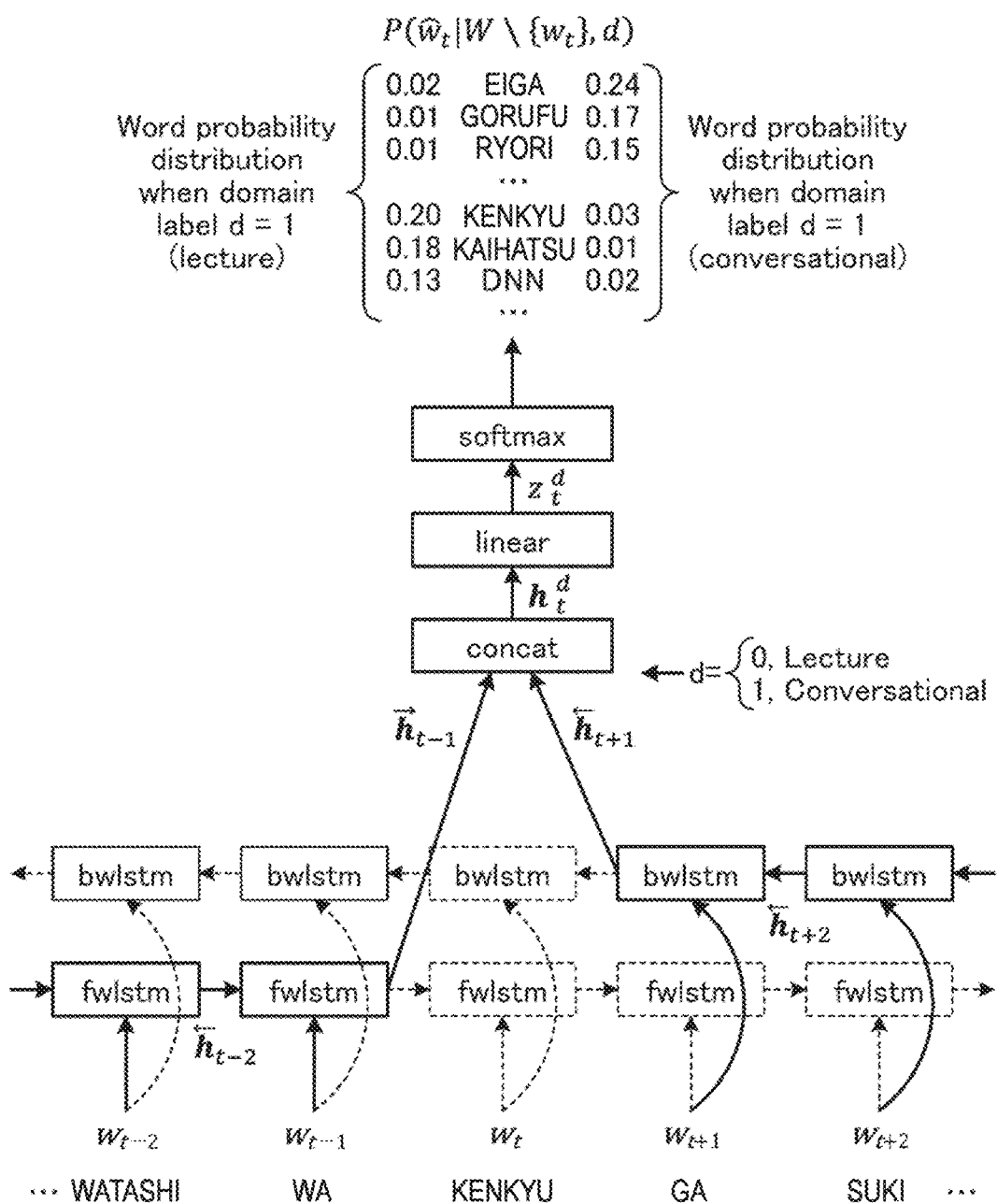
FIG. 3 is a diagram for explaining a bidirectional LSTM.

The extraction unit 132 extracts a word using the bidirectional LSTM as the replacement model (Reference Literature 1: S. Kobayashi, "Contextual Augmentation: Data Augmentation by Words with Paradigmatic Relations", in Proc. NAACL-HLT, 2018, pp. 452-457). FIG. 3 is a diagram for explaining the bidirectional LSTM. As illustrated in FIG. 3, the extraction unit 132 extracts a word obtained by inputting the first text to the bidirectional LSTM together with the label designating the domain as the second word.

Given text $W=w_{1:T}=w_1, \ldots, w_T$ of length T, the replacement model estimates the domain-dependent word probability distribution at each time $t=1, \ldots, T$. First, the extraction unit 132 generates a forward partial word string $w_{1:t-1}=w_1, \ldots, w_{t-1}$: and a backward partial word string $w_{T:t+1}=w_T, \ldots, w_{t-1}$, for time t from the given text and gives the generated partial word strings to the replacement model. In the replacement model, hidden state vectors are recursively estimated from a forward partial word string and a backward partial word string in a forward LSTM (fwlstm) layer and a backward LSTM (bwlstm) layer, and hidden state vectors at time t−1 and time t+1 are obtained as in formulas (1) and (2), respectively.

[Equation 1]

$$\vec{h}_{t-1} = \text{fwlstm}(w_{t-1}, \vec{h}_{t-2}) \quad (1)$$

[Equation 2]

$$\overleftarrow{h}_{t+1} = \text{bwlstm}(w_{t+1}, \overleftarrow{h}_{t+2}) \quad (2)$$

Furthermore, the replacement model connects each hidden state vector and the scalar value d in the concat layer as in formula (3).

[Equation 3]

$$h_t^d = \text{concat}(\vec{h}_{t-1}, \overleftarrow{h}_{t+1}, d) \quad (3)$$

Here, d is a binary domain label. In the present embodiment, as an example, it is assumed that d=0 is a lecture and corresponds to d=1 conversation. Note that, in general, learning data of a lecture domain is easy to collect, but it is difficult to collect learning data of a conversation domain. Furthermore, here, it is assumed that d=0 represents the conversion source domain and d=1 represents the conversion destination domain. $h_t^d$ is a domain-dependent hidden state vector at time t.

Furthermore, in the replacement model, $h_t^d$ is input to one linear layer, and $z_t^d$ is obtained as in formula (4). Furthermore, the replacement model inputs $z_t^d$ into the softmax layer to obtain the domain-dependent word probability distribution P at time t as in formula (5).

[Equation 4]

$$z_t^d = \text{linear}(h_t^d) \quad (4)$$

[Equation 5]

$$P(\hat{w}_t | W \backslash \{w_t\}, d) = \text{softmax}(z_t^d)_{idx(\hat{w}_t)} \quad (5)$$

Here, $\hat{w}_t$ is a predicted word at time t. In addition, $idx(\hat{w}_t)$ is an index of $\hat{w}_t$ in the dictionary information 124. In addition, $W \backslash w_t$ is a word string obtained by removing $w_t$ from the sentence W.

The learning of the replacement model is performed using learning data of both the domains of the conversion source and the conversion destination. In the learning of the replacement model, first, preliminary learning without using the domain label is performed, and then fine-tuning using the domain label is performed. Through learning with domain labels, the replacement model acquires domain-dependent wording.

For example, as illustrated in FIG. 3, when the forward partial word string $w_{1:t-1}=\{\ldots, \text{watashi wa}\}$ and the backward word string $w_{T:t+1}=\{\ldots, \text{suki, ga}\}$ are given, if d=0 (domain is lecture), high probability is given to words such as "kenkyu (research)", "kaihatsu (development)", and "DNN" at time t, and on the other hand, if d=1 (domain is conversation), high probability is given to words such as "eiga (movie)", "gorufu (golf)", and "ryori (dish)."

When converting the sentence of the lecture domain into the sentence of the conversation domain, the extraction unit 132 inputs a sentence that is the lecture domain (d=0) to the replacement model, and designates the domain label of the conversion destination as conversation (d=1). As a result, it is possible to generate a sentence in which the words at each time are replaced from the words in the lecture domain to the words in the conversation domain based on the input sentence in the lecture domain.

At this time, for example, when the extraction unit 132 selects the word with the maximum likelihood from the word probability distribution as the simplest method at each time, only the sentence of one conversation domain can be generated from the sentence of one lecture domain, and the data cannot be enriched. Therefore, in order to generate sentences of a plurality of conversation domains from a sentence of one lecture domain and to enrich data, the extraction unit 132 introduces a sampling method based on the Gumbel distribution.

Specifically, the extraction unit 132 samples values corresponding to the vocabulary size from the Gumbel distribution and adds the values to the word probability distribution estimated by the replacement model to generate a new word probability distribution.

Subsequently, the confusion network generation unit 133 repeatedly generates a new word probability distribution obtained by sampling based on the replacement model and the Gumbel distribution in the extraction unit 132 for all the words (each time) included in the conversion source text (sentence) of the input. Here, it is assumed that the words in the word probability distribution are sorted in descending order of their probability values.

Figure 4:
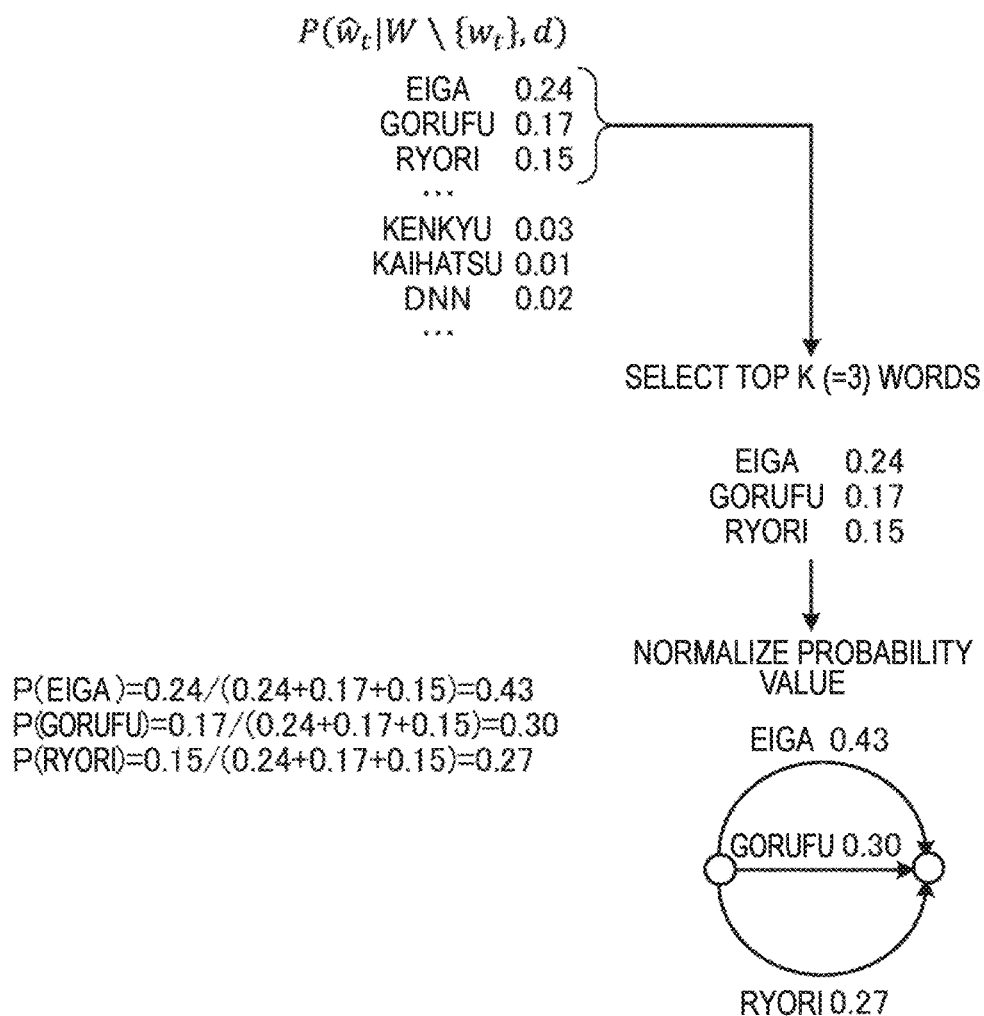
FIG. 4 is a diagram for explaining word selection by a confusion network generation unit illustrated in FIG. 1.

FIG. 4 is a diagram for explaining word selection by the confusion network generation unit 133 illustrated in FIG. 1. As illustrated in FIG. 4, the confusion network generation unit 133 selects a word from the top of the word probability distribution at each time. At this time, when a word is selected from the top K words or from the top, the word is selected such that the cumulative probability does not exceed Q (either one or both of K and Q may be used). As K and Q (second parameters) are larger, the number of words remaining in each segment of the confusion network is larger, and as K and Q are smaller, the number of words remaining in each segment of the confusion network is smaller. K and Q can be said to be parameters for setting the number of words indicated in each segment of the confusion network.

K and Q are, for example, K=5 and Q=0.8. When the word is selected in this manner, the total value of the probabilities of the words is less than 1 at each time, and thus, after selecting the word at each time, the confusion network generation unit 133 performs normalization such that the probabilities of the words are 1 in total. With this processing, the confusion network generation unit 133 can generate a confusion network $N_1$ that expresses a plurality of sentence possibilities with one network configuration and is an expression format of a word sequence as illustrated in FIG. 2.

Next, the selection unit 134 selects a word string to be finally output from the confusion network. As is clear from the above confusion network generation procedure, the word in the confusion network is independently generated at each time (each segment) without considering the preceding and subsequent contexts and the like. For this reason, when words on the word confusion network are connected, a word string that is not necessarily grammatically correct can also be generated.

For example, when a word having the highest probability value (a word located at the top at each time) is connected from the confusion network $N_1$ of FIG. 2, a word string that is not grammatically correct is generated such as "kare wa eiga wo suru (he does a movie)."

Therefore, in order to generate a grammatically correct word string, the selection unit 134 searches the word string in the confusion network using the language model that evaluates the correctness of the grammar of the word string, and finally selects the word string to be output. At this time, as the language model, for example, an LSTM language model that can evaluate grammatical correctness of a word string can be used.

Specifically, the search is performed according to formula (6) which is an evaluation formula (probability value) of the following partial word string $w_{1:t} = w_1, \ldots, w_t$, and a word string is selected.

[Equation 6]

$$\log P(w_{1:t}) = \lambda \log P_{lstm}(w_t|w_{1:t-1}) + (1-\lambda)\log P_{cn}(w_t) + \log P(w_{1:t-1}) \quad (6)$$

Here, $P_{lstm}(w_t|w_{1:t-1})$ is a prediction probability of the next word $w_t$ by the LSTM language model when the partial word string (word history) $w_{1:t-1}$ from the beginning of the sentence is given. $P_{cn}(w_t)$ is a probability of the word $w_t$ in the confusion network. $P(w_{1:t-1})$ is an evaluation formula (probability value) of a partial word string one time ago (shorter by one word). $\lambda$ (first parameter) is a parameter for balancing $P_{lstm}(w_t|w_{1:t-1})$ and $P_{cn}(w_t)$, and $0 \leq \lambda \leq 1$. In other words, $\lambda$ is a parameter indicating a degree of priority between a grammatically correct word string ($P_{lstm}(w_t|w_{1:t-1})$) and a word string ($P_{cm}(w_t)$) having diversity. As $\lambda$ is set closer to 1, grammatical correctness of the word string is emphasized, and conversely, as $\lambda$ is set closer to 0, diversity of the word string is emphasized.

The selection unit 134 performs beam search based on the evaluation formula of formula (6). At the time of beam search, an upper limit is set to the number of partial word strings to be considered during the search. For this purpose, the partial word string is pruned. The number of partial word strings after pruning is limited to the top B, and the other partial word strings are pruned. B is set to, for example, B=5. The search is performed up to time T, and the selection unit 134 selects the word string having the highest probability value as the word string of the finally generated conversion destination domain at time T.

Then, the closer $\lambda$ is to 1, the more important the grammatical correctness of the selected word string is. Conversely, as $\lambda$ approaches 0, diversity is emphasized such that various words are included in the selected word string rather than grammatical correctness. The selection unit 134 preferentially outputs either a grammatically correct word string or a word string having diversity according to $\lambda$ set in advance.

At this time, in a case where K and Q are set to relatively large values, and the number of words remaining in each segment of the confusion network is large, the number of word strings having diversity increases. Therefore, $\lambda$ may be brought close to 1, and adjustment may be performed such that the number of word strings to be output does not excessively increase. In addition, in a case where K and Q are set to relatively small values, and the number of words remaining in each segment of the confusion network is small, the number of word strings having diversity increases. Therefore, $\lambda$ may be brought close to 0, and adjustment may be performed such that the number of word strings to be output does not excessively decrease. In this manner, it is also possible to adjust the value of $\lambda$ according to K and Q for setting the number of words indicated in each segment of the confusion network.

Figure 5:
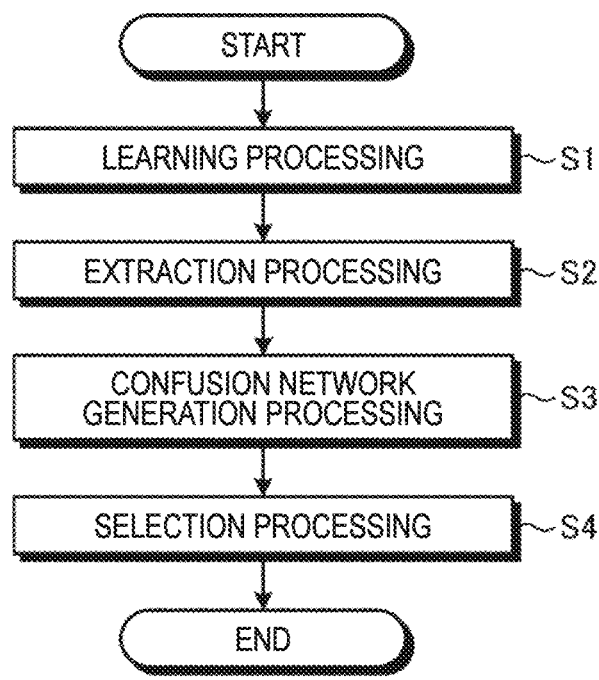
FIG. 5 is a flowchart illustrating a processing procedure of a data processing method according to an embodiment.

[Data Processing Method] Next, a processing procedure of the data processing method according to the present embodiment will be described. FIG. 5 is a flowchart illustrating a processing procedure of a data processing method according to the embodiment.

As illustrated in FIG. 5, learning processing of learning the language model is performed using the conversion source/destination domain text data 121 (step S1). Subsequently, the extraction unit 132 performs extraction processing of extracting a second word corresponding to the first word included in the first text (sentence) from among a plurality of words belonging to a predetermined domain (step S2).

The confusion network generation unit 133 repeats the extraction processing in the extraction unit 132 for all the words in the text to perform the confusion network generation processing of generating the confusion network (step S3). The selection unit 134 performs selection processing of searching for a grammatically correct word string in the confusion network using a language model for evaluating grammatical correctness of the word string and selecting a word string to be output (step S4).

[Verification Experiment] Verification experiments were conducted to verify the effectiveness of the embodiments. This verification experiment will be described. In the experiment, CSJ lecture voice corpus (Reference Literature 2: K. Maekawa, "CORPUS OF SPONTANEOUS JAPANESE: ITS DESIGN AND EVALUATION", in Proc. Workshop on Spontaneous Speech Processing and Recognition (SSPR), 2003, pp. 7-12) (hereinafter, CSJ) was used as text data of the conversion source domain. In addition, the NTT meeting (multi-person free conversation) voice corpus (Reference Literature 3: T. Hori, S. Araki, T. Yoshioka, M. Fujimoto, S. Watanabe, T. Oba, A. Ogawa, K. Otsuka, D. Mikami, K. Kinoshita, T. Nakatani, A. Nakamura, and J. Yamato, "Low-Latency Real-Time Meeting Recognition and Understanding Using Distant Microphones and Omni-Directional Camera", IEEE TASLP, vol. 20, no. 2, pp. 499-513, February 2012) (hereinafter, NTT) was used as text data of the conversion destination domain.

In the experiment, CSJ was converted into the NTT conversation domain by the method of the embodiment, and five pieces of data with the data amounts of 1 time, 10 times, and 100 times were generated (expressed as GenCSJx{1, 10,100}).

In addition, five trigram language models were learned using NTT, CSJ, and GenCSJx{1, 10,100}, respectively (hereinafter, the trigram language model is expressed by the learning data name.). In addition, a trigram language model (NTT+CSJ) obtained by adding weights to NTT and CSJ based on PPL for NTT Development Data, and three trigram language models (NTT+CSJ+GenCSJx{1,10,100}) obtained by adding weights to NTT, CSJ, and GenCSJx{1, 10,100} were created (refer to Non Patent Literature 1 and 2 for weight calculation procedures).

PPL, out-of-vocabulary rate (OOV), and word error rate (WER) for both NTT development (Data of which correct answer is known and which is used for each parameter setting) and NTT evaluation data (data with unknown results) of the above nine trigram language models were obtained. It is to be noted that, for any of PPL, OOV, and WER, smaller values indicate better accuracy.

FIG. 6 is a diagram illustrating details of a data set. FIG. 7 is a diagram illustrating an experimental result in a verification experiment.

The effectiveness of the method according to the present embodiment can be confirmed by comparing 2.CSJ with 3. to 5. GenCSJx{1,10,100} in FIG. 7. This is because 3. to 5. show lower OOV and WER compared to 2. Note that due to the different vocabulary sizes of the models, a fair comparison of PPL cannot be made, and PPL is shown with ( ).

Then, by comparing data of 2.CSJ and 3.GenCSJx1, it was found that 38.5% of words were replaced. Furthermore, 3. to 5. show lower WER and OOV compared to 1.NTT. In addition, according to the comparison within 3. to 5., the OOV and WER of 5. in which the data amount is 100 times are lower than those in which the data amount is 1 time and 10 times, and thus, it is possible to confirm the effect of generating a large amount of data. According to the comparison within 6. NTT+CSJ and 7 to 9. NTT+CSJ+GenCSJx{1,10,100}, it is possible to confirm that the final reduction in WER can be obtained by the method of the present embodiment.

[Effects of Embodiment] As described above, in the embodiment, it is possible to enrich the learning data by extracting a second word corresponding to a first word included in first text from among a plurality of words belonging to a predetermined domain, by repeating extraction processing for all words included in the first text to generate a confusion network that expresses a plurality of sentence possibilities with one network configuration and is an expression format of a word sequence, and by searching for a grammatically correct word string in the confusion network using a language model that evaluates grammatical correctness of the word string, and selecting a word string to be output.

Furthermore, as also shown in the above verification experiment, the learning data generated using the data processing method according to the present embodiment shows low OOV, PPL, and WER even when a large amount of data is generated. Therefore, according to the present embodiment, it is possible to enrich learning data to improve the accuracy of a language model.

Note that, in the above description, a language model based on LSTM is used as the replacement model and the language model for selecting the word string to be finally output from the confusion network, but a language model based on Transformer (Reference Literature 4: Ashish Vaswani, Noam Shazeer, Niki Parmar, Jakob Uszkoreit, Llion Jones, Aidan N. Gomez, Lukasz Kaiser, Illia Polosukhin, "Attention is all you need", Proceedings of the 31st International Conference on Neural Information Processing (NIPS) 2017) may be used.

Figure 8:
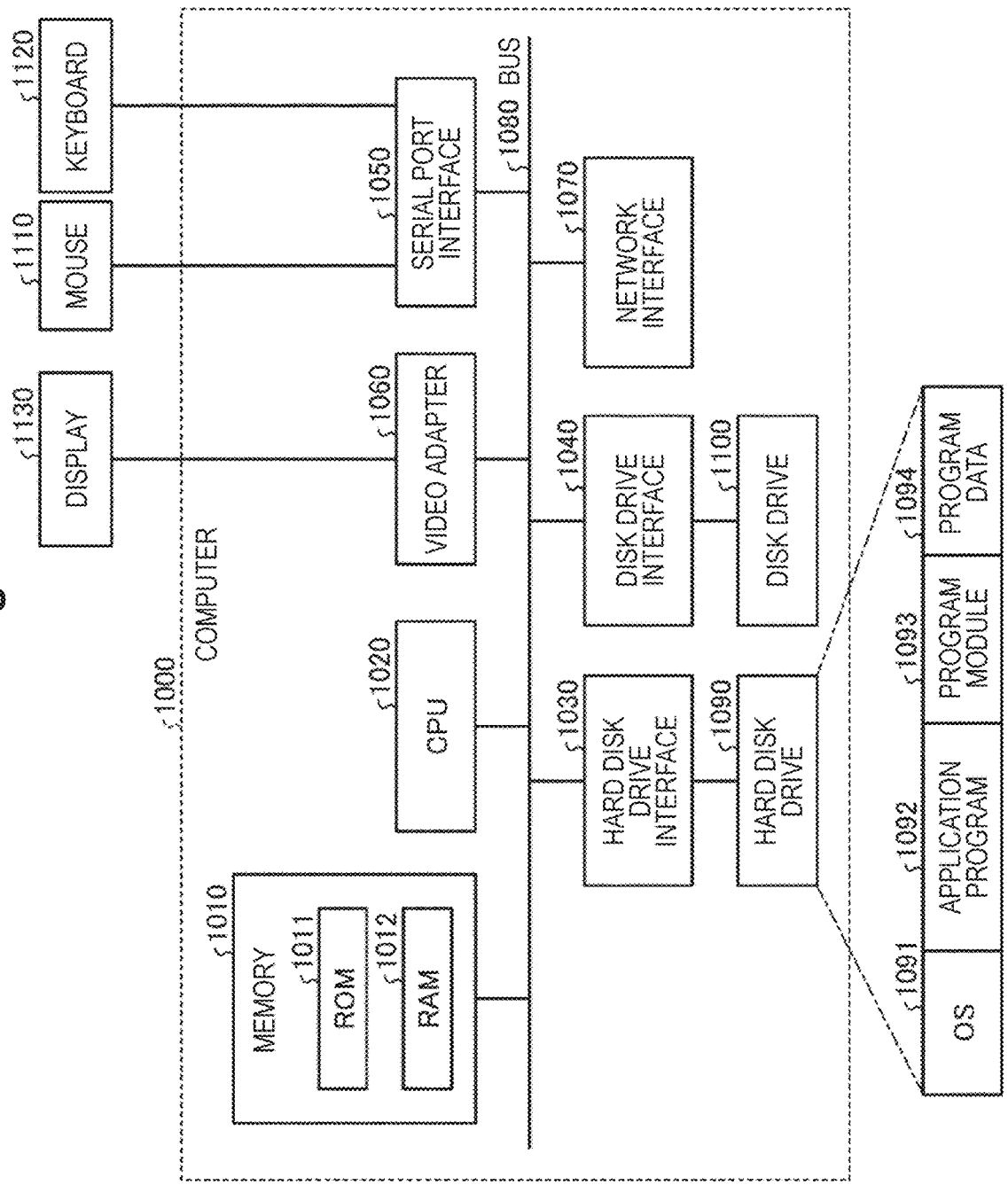
FIG. 8 is a diagram illustrating an example of a computer on which a data processing device is implemented by executing a program.

[Program] FIG. 8 is a diagram illustrating an example of a computer on which the data processing device 10 is implemented by executing a program. A computer 1000 includes, for example, a memory 1010 and a CPU 1020. Further, the computer 1000 also includes a hard disk drive interface 1030, a disk drive interface 1040, a serial port interface 1050, a video adapter 1060, and a network interface 1070. These units are connected to each other by a bus 1080.

The memory 1010 includes a read only memory (ROM) 1011 and a RAM 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disc is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an operating system (OS) 1091, an application program 1092, a program module 1093, and program data 1094. That is, the program that defines each processing of the data processing device 10 is implemented as the program module 1093 in which a code executable by the computer is described. The program module 1093 is stored in, for example, the hard disk drive 1090. For example, the program module 1093 for executing processing similar to the functional configurations in the data processing device 10 is stored in the hard disk drive 1090. Note that the hard disk drive 1090 may be replaced with a solid state drive (SSD).

Furthermore, setting data used in the processing of the above-described embodiment is stored, for example, in the memory 1010 or the hard disk drive 1090 as the program data 1094. Then, the CPU 1020 reads the program module 1093 and the program data 1094 stored in the memory 1010 or the hard disk drive 1090 to the RAM 1012, and executes the program module 1093 and the program data 1094 as necessary.

Note that the program module 1093 and the program data 1094 are not limited to being stored in the hard disk drive 1090, and may be stored in, for example, a removable storage medium and read by the CPU 1020 via the disk drive 1100 or the like. Alternatively, the program module 1093 and the program data 1094 may be stored in another computer connected via a network (local area network (LAN), wide area network (WAN), or the like). Then, the program module 1093 and the program data 1094 may be read by the CPU 1020 from another computer via the network interface 1070.

Although the embodiments to which the invention made by the present inventor is applied have been described above, the present invention is not limited by the description and drawings constituting a part of the disclosure of the present invention according to the present embodiments. In other words, other embodiments, examples, operation techniques, and the like made by those skilled in the art and the like on the basis of the present embodiments are all included in the scope of the present invention.

REFERENCE SIGNS LIST

10 Data processing device
11 Interface unit

12 Storage unit
13 Control unit
121 Conversion source/destination domain text data
122 Language model information
123 Replacement model information
124 Dictionary information
131 Learning unit
132 Extraction unit
133 Confusion network generation unit
134 Selection unit

The invention claimed is:

1. A data processing device comprising:
processing circuitry configured to:
use a replacement model, that estimates a domain-dependent word probability distribution at a position where a word appears in a sentence, to estimate a word probability distribution obtained by replacing every first word of a plurality of first words included in text of a first domain with a second word of a second domain;
sample values corresponding to a vocabulary size from a Gumbel distribution;
add the values to the word probability distribution to generate a new word probability distribution;
repeat the generation of the new word probability distribution a plurality of times for all of the plurality of first words included in the text of the first domain, select a plurality of the second words from a top of the new word probability distribution for every first word of the plurality of first words, and arrange the selected second words to be ordered by position to generate a confusion network that expresses a plurality of sentence possibilities with one network configuration and is an expression format of a word sequence;
search for a grammatically correct word string in the confusion network using a language model that evaluates grammatical correctness of the word string; and
select a word string to be output,
wherein the language model is trained based on learning data,
wherein the data processing device adds the selected word string to the learning data to enrich the learning data,
wherein the language model is further trained using the enriched learning data, and
wherein the processing circuitry is configured to use the further trained language model to search for the grammatically correct word string in the confusion network.

2. The data processing device according to claim 1,
wherein the processing circuitry is further configured to preferentially output either the grammatically correct word string or a word string having diversity according to a preset first parameter indicating a degree of priority between the grammatically correct word string and the word string having diversity.

3. The data processing device according to claim 2, wherein a value of the first parameter is adjusted according to a second parameter that sets a number of words indicated in each segment of the confusion network.

4. A data processing method executed by a data processing device, the data processing method comprising:
using a replacement model, that estimates a domain-dependent word probability distribution at a position where a word appears in a sentence, to estimate a word probability distribution obtained by replacing every first word of a plurality of first words included in text of a first domain with a second word of a second domain, sampling values corresponding to a vocabulary size from a Gumbel distribution, and adding the values to the word probability distribution to generate a new word probability distribution;
repeating the generation of the new word probability distribution a plurality of times for all of the plurality of first words included in the text of the first domain, select a plurality of the second words from a top of the new word probability distribution for every first word of the plurality of first words, and arrange the selected second words to be ordered by position to generate a confusion network that expresses a plurality of sentence possibilities with one network configuration and is an expression format of a word sequence; and
searching for a grammatically correct word string in the confusion network using a language model that evaluates grammatical correctness of the word string; and
selecting a word string to be output,
wherein the language model is trained based on learning data,
wherein the method further comprises adding the selected word string to the learning data to enrich the learning data,
wherein the language model is further trained using the enriched learning data, and
wherein the method further comprises using the further trained language model to search for the grammatically correct word string in the confusion network.

5. A non-transitory computer-readable recording medium storing therein a data processing program that causes a computer to execute a process comprising:
using a replacement model, that estimates a domain-dependent word probability distribution at a position where a word appears in a sentence, to estimate a word probability distribution obtained by replacing every first word of a plurality of first words included in text of a first domain with a second word of a second domain, sampling values corresponding to a vocabulary size from a Gumbel distribution, and adding the values to the word probability distribution to generate a new word probability distribution;
repeating the generation of the new word probability distribution a plurality of times for all of the plurality of first words included in the text of the first domain, select a plurality of the second words from a top of the new word probability distribution for every first word of the plurality of first words, and arrange the selected second words to be ordered by position to generate a confusion network that expresses a plurality of sentence possibilities with one network configuration and is an expression format of a word sequence; and
searching for a grammatically correct word string in the confusion network using a language model that evaluates grammatical correctness of the word string, and
selecting a word string to be output,
wherein the language model is trained based on learning data,
wherein the process further comprises adding the selected word string to the learning data to enrich the learning data,
wherein the language model is further trained using the enriched learning data, and
wherein the process further comprises using the further trained language model to search for the grammatically correct word string in the confusion network.

6. The data processing device according to claim 1, wherein the first domain is different from the second domain.

7. The data processing device according to claim 6, wherein
the first domain includes text in a formal style, and
the second domain includes text in a conversational style.

8. The data processing device according to claim 1, wherein
the first domain includes text in a formal style, and
the second domain includes text in a colloquial style.

9. The data processing device according to claim 1, wherein domain corresponds to a category defined by a content of a sentence, a style of the sentence, or a combination thereof.

10. The data processing device according to claim 1, wherein the replacement model is a bidirectional long short-term memory (LSTM) model configured to estimate the domain-dependent word probability distribution by processing a forward partial word string of the text of the first domain and a backward partial word string of the text of the first domain.

11. The data processing device according to claim 10, wherein the replacement model generates a domain-dependent hidden state vector by concatenating hidden state vectors from a forward LSTM layer, a backward LSTM layer, and a binary domain label indicating the second domain.

12. The data processing device according to claim 1, wherein the processing circuitry is configured to select the plurality of the second words from the top of the new word probability distribution such that a cumulative probability of the selected second words does not exceed a preset threshold.

13. The data processing device according to claim 12, wherein the processing circuitry is configured to normalize probabilities of the selected second words such that a total probability equals one for each position in the confusion network.

14. The data processing device according to claim 1, wherein the replacement model is trained using learning data from both the first domain and the second domain.

15. The data processing device according to claim 1, wherein the processing circuitry is configured to select the plurality of the second words from a top K words of the new word probability distribution, where K is a preset parameter determining a number of words per segment of the confusion network.

* * * * *